US010841225B2

(12) United States Patent
Lam

(10) Patent No.: US 10,841,225 B2
(45) Date of Patent: Nov. 17, 2020

(54) LOAD BALANCING USING DYNAMICALLY RESIZABLE CONSISTENT HASHING

(71) Applicant: Arista Networks, Inc., Santa Clara, CA (US)

(72) Inventor: Peter Lam, Anmore (CA)

(73) Assignee: Arista Networks, Inc., Santa Clara, CA (US)

( * ) Notice: Subject to any disclaimer, the term of this patent is extended or adjusted under 35 U.S.C. 154(b) by 83 days.

(21) Appl. No.: 16/294,860

(22) Filed: Mar. 6, 2019

(65) Prior Publication Data
US 2020/0287831 A1 Sep. 10, 2020

(51) Int. Cl.
H04L 12/743 (2013.01)
H04L 12/803 (2013.01)
H04L 12/819 (2013.01)
H04L 12/741 (2013.01)

(52) U.S. Cl.
CPC .......... H04L 45/7453 (2013.01); H04L 45/54 (2013.01); H04L 47/125 (2013.01); H04L 47/21 (2013.01)

(58) Field of Classification Search
CPC ............... H04L 47/125; H04L 67/1002; H04L 67/1023; H04L 29/08252; H04L 45/125; H04L 67/1027; H04L 67/10; G06F 9/5083
See application file for complete search history.

(56) References Cited

U.S. PATENT DOCUMENTS 10,616,111 B1 * 4/2020 Immidi ............... H04L 45/7453
2012/0134497 A1 * 5/2012 Roitshtein ............ H04L 47/70 380/259
2018/0007126 A1 * 1/2018 Borst .................. H04L 67/1023

* cited by examiner

Primary Examiner — Hitesh Patel
(74) Attorney, Agent, or Firm — Fountainhead Law Group PC

(57) ABSTRACT

Packet forwarding includes creating a first lookup table for mapping packets to nodes based on the number of nodes in a first set of nodes. A received packet is mapped to a mapping value using a predetermined mapping function. The first lookup table is indexed using a first subset of bits comprising the mapping value. A second lookup table is created in response to adding a node to the first set of nodes. A subsequently received packet is mapped to a mapping value using the same predetermined mapping function to index the second lookup table using a second subset of bits comprising the mapping value.

20 Claims, 12 Drawing Sheets

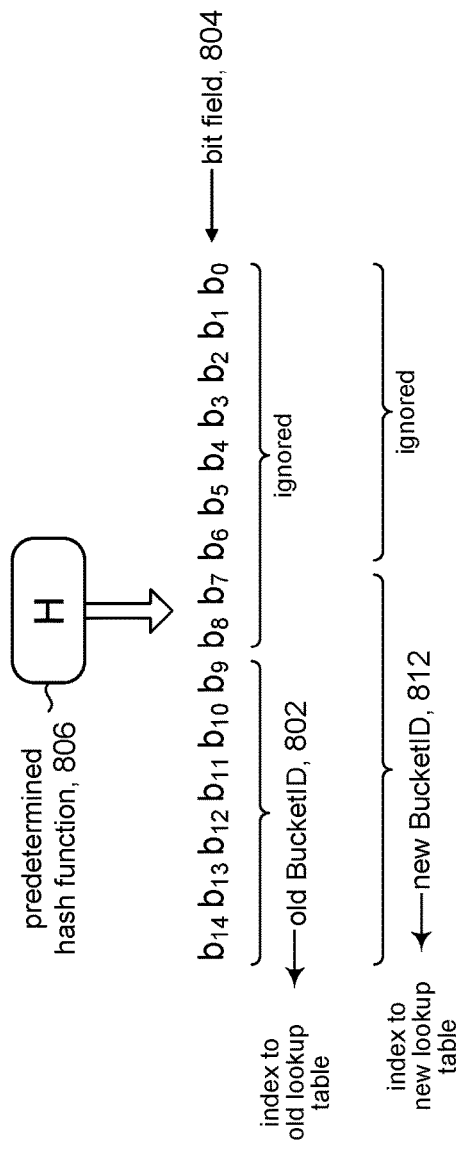
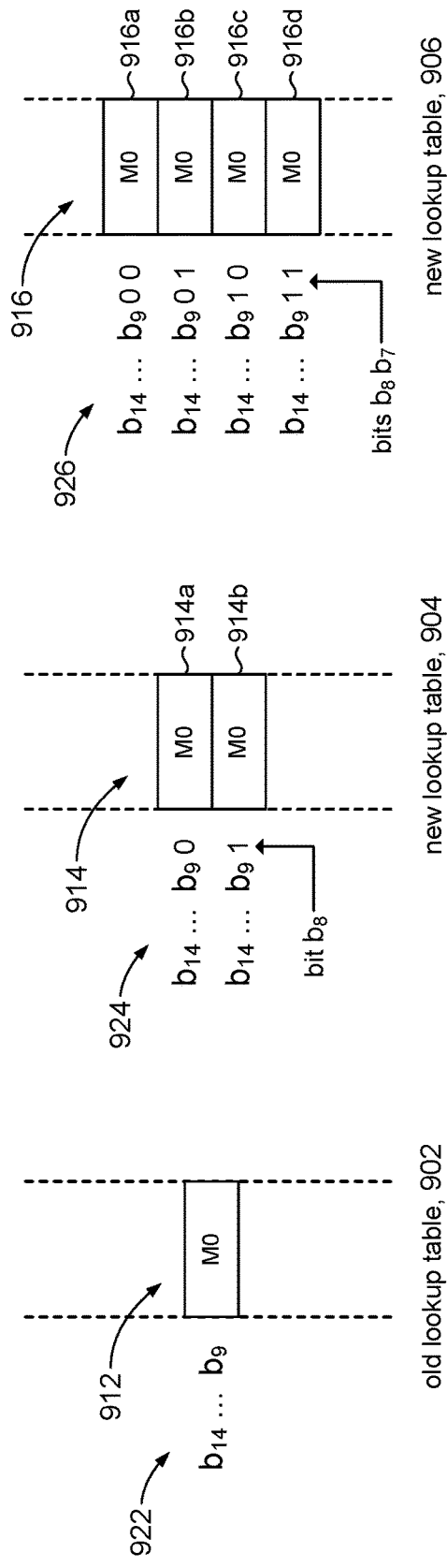
FIG. 8
FIG. 9A
FIG. 9B
FIG. 9C

```
00xxxxx iiiiiiii => M0   (partition, 1012a)
01xxxxx iiiiiiii => M1   (partition, 1012b)
10xxxxx iiiiiiii => M2   (partition, 1012c)
11xxxxx iiiiiiii => M3   (partition, 1012d)
```

```
000xxxx iiiiiiii => M0
0010xxx iiiiiiii => M0
00110xx iiiiiiii => M4
001110x iiiiiiii => M4
0011110 iiiiiiii => M4
0011111 iiiiiiii => M0
010xxxx iiiiiiii => M1
0110xxx iiiiiiii => M1
01110xx iiiiiiii => M4
011110x iiiiiiii => M4
0111110 iiiiiiii => M4
0111111 iiiiiiii => M1
100xxxx iiiiiiii => M2
1010xxx iiiiiiii => M2
10110xx iiiiiiii => M4
101110x iiiiiiii => M4
1011110 iiiiiiii => M4
1011111 iiiiiiii => M2
110xxxx iiiiiiii => M3
1110xxx iiiiiiii => M3
11110xx iiiiiiii => M4
111110x iiiiiiii => M4
1111110 iiiiiiii => M4
1111111 iiiiiiii => M3
```

FIG. 10E

LOAD BALANCING USING DYNAMICALLY RESIZABLE CONSISTENT HASHING

BACKGROUND

Load balancing generally involves mapping a packet (e.g., using a hash function) to a bucket in a hash table (lookup table). The mapped bucket is associated with or otherwise identifies a member node to which the packet is to be forwarded. Basically, when a packet is received, a hash value is computed by applying the hash function to a portion of the packet (e.g., an addressing portion). The hash value is then used to index an entry (bucket) in a lookup table to obtain a mapping to a member node, to which the received packet is forwarded.

SUMMARY

In accordance with the present disclosure, packet forwarding can include forwarding a received packet to a node in a first plurality of nodes using a first subset of bits of a mapping value. The mapping value can be computed from the received packet using a predetermined mapping function. The first subset of bits can be used as an address of an entry in a first lookup table that comprises a plurality of entries associated with the first plurality of nodes. The received packet can be forwarded to the node associated with the addressed entry. The first subset of bits can be selected from the mapping value according to a first set of bit positions.

Packet forwarding in accordance with the present disclosure can further include creating a second lookup table in response to a new node being added to the first plurality of nodes to define a second plurality of nodes. Each entry in the first lookup table can correspond to two or more entries in the second lookup table. Each entry in the second lookup table can be associated with either the same node as its corresponding entry in the first lookup table or the new node.

Packet forwarding in accordance with the present disclosure can further include forwarding a subsequently received packet (received subsequent to creating the second lookup table) to a node from among the second plurality of nodes using a second subset of bits of a mapping value. The mapping value can be computed from the subsequently received packet using the predetermined mapping function. The second subset of bits can be used as an address of an entry in the second lookup table. The subsequently received packet can be forwarded to the node associated with the addressed entry. The second subset of bits can be selected from the mapping value according to a second set of bit positions, where the second set of bit positions includes the first set of bit positions plus one or more additional bit positions.

In some embodiments, the first lookup table can be created by determining a number of entries for the first lookup table based on the number of nodes in the first plurality of nodes and determining a number of bit positions in the first set of bit positions based on the determined number of entries in the lookup table. The number of entries in the first lookup table can be determined based on an unevenness metric. A lookup table can be created as the first lookup table having $2^n$ entries, where n is the determined number of bit positions in the first set of bit positions.

In some embodiments, the operation of creating the second lookup table can include determining a second set of bit positions by adding one or more additional bit positions to the first set of bit positions and creating a lookup table comprising $2^m$ entries as the second lookup table, where m is the determined number of bit positions in the second set of bit positions.

In some embodiments, the number of additional bit positions in the second set of bit positions can be based on an unevenness metric.

In some embodiments, the second lookup table can comprise $2^x$ times as many entries as in the first lookup table, where x is an integer greater than 0.

In some embodiments, a portion of each address of the entries in the second lookup table includes an address of their corresponding entries in the first lookup table.

In some embodiments, a given packet that maps to a given node using the first lookup table will map to the given node or to the new node using the second lookup table.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 8 illustrates an example of defining a new BucketID in accordance with some embodiments.

FIGS. 9A, 9B, 9C illustrate mapping buckets in an old lookup table (FIG. 9A) to buckets in a new lookup table (FIG. 9B, 9C) in accordance with some embodiments.

FIG. 10E illustrates re-partitioning a bucket space to in response to adding a new node in accordance with some embodiments.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
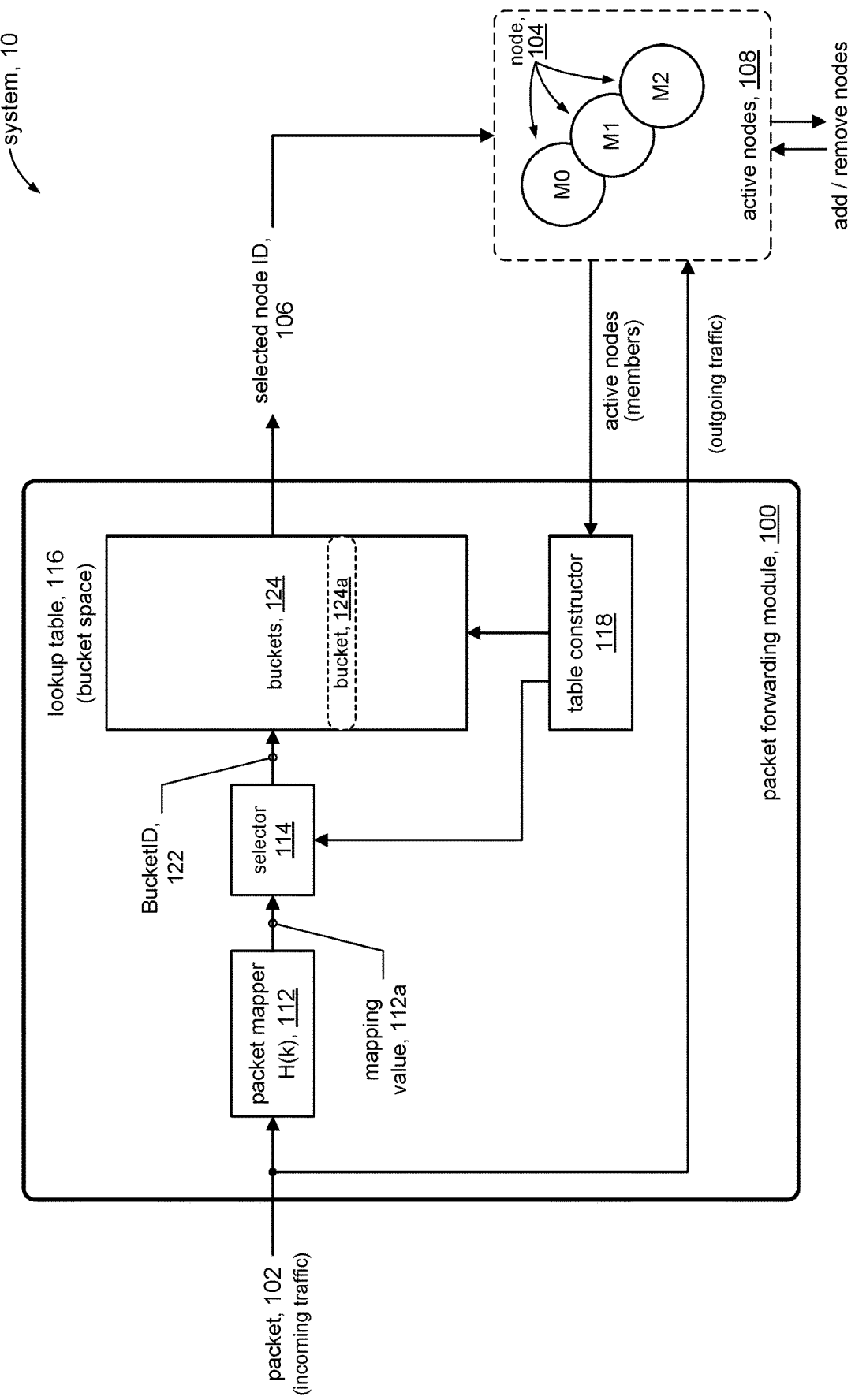
FIG. 1 illustrates a system block diagram in accordance with some embodiments.

FIG. 1 shows system 10 configured with packet forwarding module 100 in accordance with embodiments of the present disclosure. Packet forwarding module 100 can be a component (e.g., a data plane) in a network device (e.g., a network switch), in a system such as frame relay network, or the like. Packet forwarding module 100 can receive incoming traffic in the form of data packets 102, and then forward data packet 102 in the outgoing traffic to node (member) 104 from among a set of forwarding destination nodes (active nodes) 108.

Each packet belongs to a flow or connection. A flow can be defined as a sequence of packets sent from a particular source (e.g. a laptop) to a particular destination (e.g. a web server). When a flow is set up with node 104, that node may contain state information and cached data to facilitate the flow. In order to avoid disrupting the traffic flows, packet forwarding module 100 attempts to consistently route incoming packets for a given flow to the same node 104. Moreover, packet forwarding module 100 attempts to distribute the flows evenly among the set of active nodes 108 in order to evenly distribute the traffic load.

Packet forwarding module 100 can include packet mapper 112 that outputs mapping value 112a. Packets have an address or routing portion and a payload (i.e., the data carried). Packet mapper 112 is configured to map the addressing portion to mapping value 112a. The addressing portion of packet 102 can be used to form a 5-tuple, which generally includes the source IP address, source port, destination IP address, destination port, and the protocol. Forwarding packets in a flow can be based on the 5-tuple so that those packets are always mapped to the same forwarding destination node 104. For example, the 5-tuple:

191.168.124.100/512/80.209.128.69/80/6 can be generated for a packet coming from port 512 of IP address 191.168.124.100, going to port 80 at IP address 80.209.128.69, using IP protocol 6, which is TCP. It is desirable to forward packets that belong to a given flow to the same forwarding node. For example, in a shopping cart application the items in a user's cart might be stored at the browser level until the user is ready to purchase them. Changing which server (node) receives requests from that client in the middle of the shopping session can cause performance issues or outright transaction failure. In such cases, it is important that all requests from a client are sent to the same server for the duration of the session. Another example is when an upstream server (node) stores information requested by a user in its cache to boost performance. Switching servers would cause that information to be fetched for the second time, creating performance inefficiencies.

In an embodiment, packet mapper 112 implements a hash function H(k) (e.g., MD5, SHA-1, etc.) that outputs mapping value 112a referred to as a hash value, where 'k' is data from data packet 102 (e.g., the 5-tuple). It will be appreciated, that packet mapper 112 can employ any suitable mapping function other than a hash function. The remaining discussion will make reference to hash functions and hash values interchangeably with packet mapper 112 and mapping value 112a, respectively.

Packet forwarding module 100 can include selector 114 that receives mapping value 112a from packet mapper 112 and outputs bucket identifier (BucketID) 122. In accordance with the present disclosure, selector 114 can select a bitwise portion of mapping value 112a to form BucketID 122. For example, if mapping value 112a is an n-bit value, then BucketID 122 can be an m-bit portion of mapping value 112a, where m<n. This aspect is discussed in more detail below.

Packet forwarding module 100 can include lookup table 116 comprising a set of table entries referred to herein as buckets 124 that define a bucket space. The buckets 124 can be indexed by BucketID 122 generated by selector 114. Each bucket 124a is associated with node 104. For example, each bucket 124a can store a node ID of its associated node 104. In some embodiments, bucket 124a may store additional information about its associated node 104.

Lookup table 116 can output selected node ID 106 stored in bucket 124a indexed by BucketID 122. Node ID 106 identifies node 104 to which packet forwarding module 100 will forward received packet 102.

Packet forwarding module 100 can include table constructor 118. In accordance with the present disclosure, table constructor 118 can construct lookup table 116 to accommodate the number of currently active nodes 108. As nodes 104 are added to the set of active nodes 108, table constructor 118 can dynamically adjust the sizing of lookup table 116 and BucketID 122 used to index lookup table 116. In accordance with some embodiments, the sizing of lookup table 116 can be optimized based on a metric referred to as "unevenness." These aspects of the present disclosure are discussed in more detail below.

In some embodiments, packet forwarding module 100 can be a hardware-based implementation comprising a combination of hardware, programmable hardware, and firmware. For example, a hardware implementation (e.g., an application-specific IC, ASIC) may be suitable for a forwarding plane in a fabric switching device where wire-speed operation is important. In other embodiments, packet forwarding module 100 can be implemented as software modules on a computer system. In still other embodiments, packet forwarding module 100 can be implemented as some combination of hardware modules and software modules.

Figure 2:
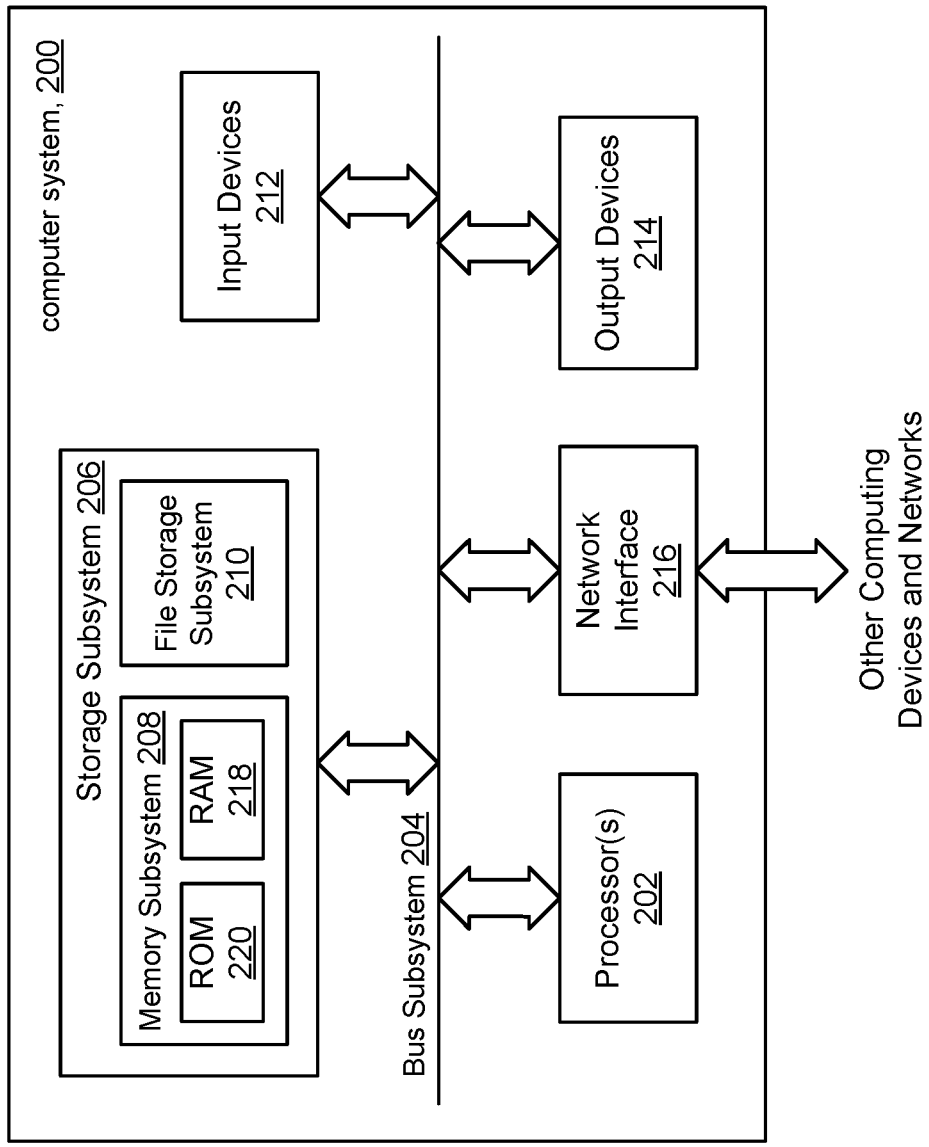
FIG. 2 illustrates a computer system in accordance with some embodiments.

FIG. 2 depicts a simplified block diagram of an example computer system 200 according to certain embodiments. Computer system 200 can be used to implement packet forwarding module 100 described in the present disclosure. As shown in FIG. 2, computer system 200 includes one or more processors 202 that communicate with a number of peripheral devices via bus subsystem 204. These peripheral devices include storage subsystem 206 (comprising memory subsystem 208 and file storage subsystem 210), user interface input devices 212, user interface output devices 214, and network interface subsystem 216.

Bus subsystem 204 can provide a mechanism for letting the various components and subsystems of computer system 200 communicate with each other as intended. Although bus subsystem 204 is shown schematically as a single bus, alternative embodiments of the bus subsystem can utilize multiple busses.

Network interface subsystem 216 can serve as an interface for communicating data between computer system 200 and other computer systems or networks. Embodiments of network interface subsystem 216 can include, e.g., an Ethernet card, a Wi-Fi and/or cellular adapter, a modem (telephone, satellite, cable, ISDN, etc.), digital subscriber line (DSL) units, and/or the like.

User interface input devices 212 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 200.

User interface output devices 214 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 200.

Memory subsystem 206 includes memory subsystem 208 and file/disk storage subsystem 210 represent non-transitory computer-readable storage media that can store program code and/or data, which when executed by processor 202, can cause processor 202 to provide the functionality of embodiments of the present disclosure.

Memory subsystem 208 includes a number of memories including main random access memory (RAM) 218 for storage of instructions and data during program execution and read-only memory (ROM) 220 in which fixed instructions are stored. File storage subsystem 210 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 200 is illustrative and many other configurations having more or fewer components than system 200 are possible.

Figure 3:
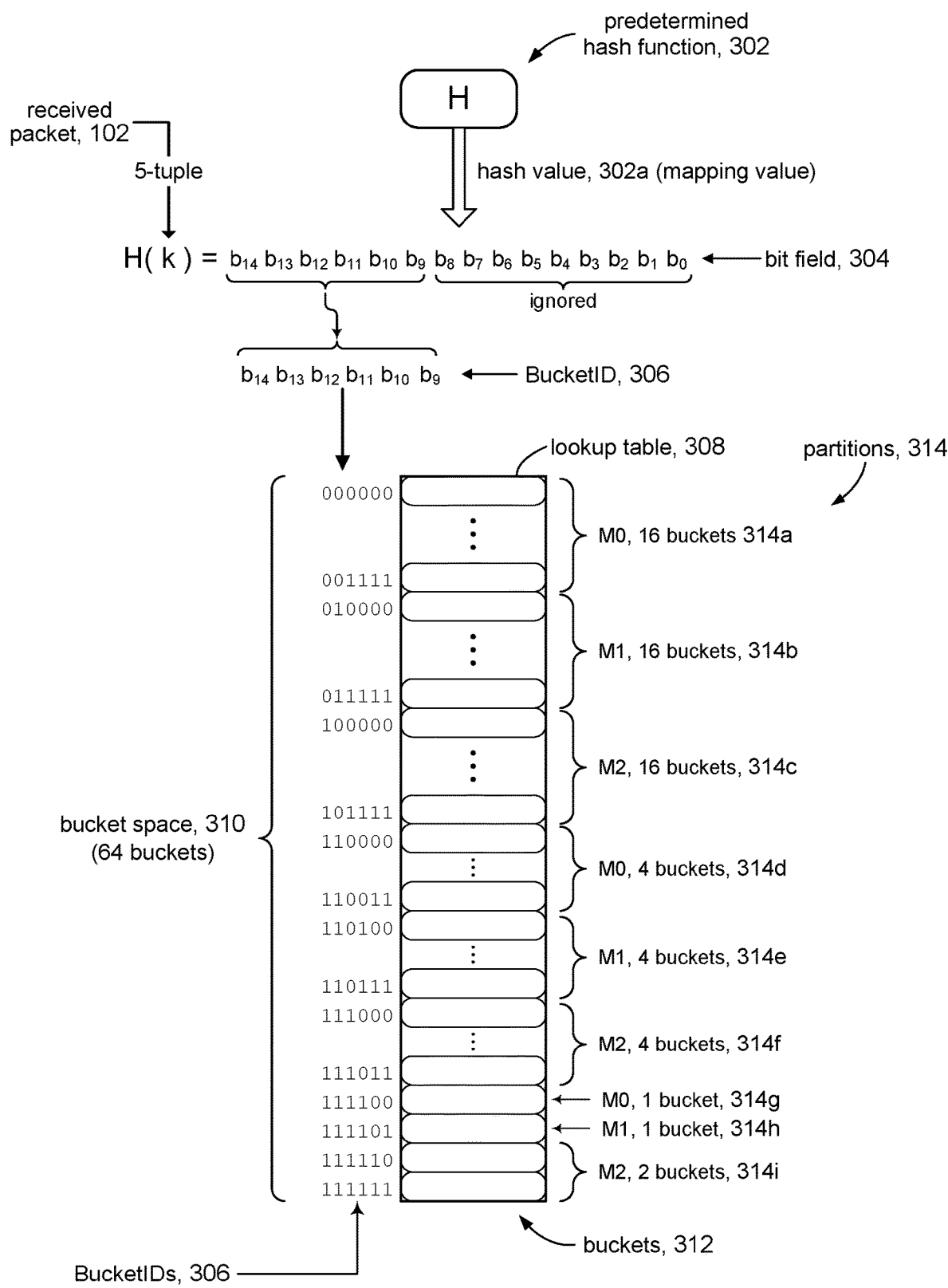
FIG. 3 illustrates details of a lookup table and the BucketID used to index the lookup table in accordance with some embodiments.

Referring to FIG. 3, additional details of packet forwarding module 100 in accordance with some embodiments will be described, using a specific example. As explained above, packet mapper 112 shown in FIG. 1 can be implemented using a hash function. In accordance with some embodiments, packet mapper 112 can include predetermined hash function 302. In accordance with the present disclosure, the same predetermined hash function 302 can be used when lookup table 116 is adjusted in response to nodes 104 being added to the set of active nodes 108. This aspect is discussed further.

Hash function 302 can produce hash value 302a using data from received packet 102, for example, a 5-tuple constructed from the addressing portion of the received packet 102. For discussion purposes, we will assume hash value 302a is 15-bit quantity, although it will be apparent that other suitably sized hash values can be used. In some embodiments, the algorithm of hash function 302 can be designed to emit 15-bit values. In other embodiments, hash value 302a can be reduced (e.g., using a modulo operator) to reduce its size to a 15-bit value. Bit field 304 of hash function 302 refers to the set of bits that comprise hash values 302a.

In accordance with the present disclosure, BucketID 306 can be defined as a predetermined m-bit subset of the bits that comprise hash value 302a. The m bits can be selected from bit field 304 comprising hash value 302a according to a set of bit positions. The illustrative example shows that six bits of bit field 304 are used to generate BucketID 306, and in particular the six bits are selected from the bit positions comprising the leftmost (high order) bits of bit field 304; the remaining (low order) bits of bit field 304 are ignored. As noted above, BucketID 306 can be generated using six bits selected from hash value 302a according to any six bit positions within its bit field 304. In FIG. 3, for example, BucketID 306 comprises the following bit field subset:

$B_{14}B_{13}B_{12}B_{11}B_{10}B_9 b_8 b_7 b_6 b_5 b_4 b_3 b_2 b_1 b_0$ where the bit positions are bit position 14 to bit position 9, assuming a convention where the lowest bit position is numbered 0. Merely to illustrate this point further, another example selects bits from the right-most bits:

$b_{14}b_{13}b_{12}b_{11}b_{10}b_9 b_8 b_7 b_6 B_5 B_4 B_3 B_2 B_1 B_0$ where the set of bit positions comprises bit position 5 to bit position 0. The next example shows bits selected from the middle of the bit field:

$b_{14}b_{13}b_{12}B_{11}B_{10}B_9 B_8 B_7 B_6 b_5 b_4 b_3 b_2 b_1 b_0$ where the set of bit positions comprises bit position 11 to bit position 6. This last example shows that the selected bits do not have to be adjacent positions:

$b_{14}B_{13}b_{12}B_{11}B_{10}b_9 b_8 b_7 B_6 B_5 b_4 b_3 B_2 b_1 b_0$ where the set of bit positions comprises bit positions 13, 11, 10, 6, 5, and 2. For the remaining discussion, the set of bit positions will refer to the leftmost subset of bits in the bit field of a hash value, without loss of generality.

BucketID 306 can be used to index lookup table 308, which defines bucket space 310. The size of lookup table 308, and hence the size of bucket space 310, can be defined by the size (e.g., number of bits) of BucketID 306. The example in FIG. 3 shows 6-bit BucketID 306, which defines bucket space of 64 buckets 312.

As illustrated in FIG. 3, in accordance with the present disclosure, bucket space 310 can be partitioned or otherwise divided into groups of buckets called bucket partitions (partitions) 314. Partition 314 may contain two or more buckets 312 (e.g., partition 314a contains 16 buckets), or may contain a single bucket 312 (e.g., partition 314g). Each partition 314, and its constituent buckets 312, is associated with, assigned to, or otherwise mapped to node 104. For example, FIG. 3 shows that partitions 314a, 314d, and 314g are associated with node M0 (FIG. 1), partitions 314b, 314e, and 314h are associated with node M1, and partitions 314b, 314f, and 314i are associated with node M2. Buckets 312 that comprise partitions 314a, 314d, and 314g are associated with node M0, and so on.

In accordance with the present disclosure, the size of the partitions 314 (e.g., number of constituent buckets 312) are even in order to evenly distribute the number of buckets 312 among active nodes 108. In the case that the number of active nodes 108 is an integer multiple of the number of buckets 312 (size) in bucket space 310, then each node will be associated with the same number of buckets; e.g., 16 nodes into 128 buckets associates 4 buckets per node. When the number of active nodes 108 is not an integer multiple of the size of bucket space 310, then one or more nodes will have an additional bucket assigned to it relative to the other nodes. In FIG. 3, for example, 64 buckets are divided among three nodes so that node M0 is associated with 22 buckets, M1 is associated with 21 buckets, and M2 is associated with 21 buckets. This aspect is discussed in more detail below.

In accordance with some embodiments of the present disclosure, partitions 314 can be defined as contiguous portions of bucket space 310, so that partitions 314 having two or more buckets 312 have contiguously numbered buckets. For example, FIG. 3 shows that partition 314a comprises 16 buckets having consecutive BucketIDs from '000000' to '001111' Likewise, partition 314e comprises four buckets having consecutive BucketIDs from '110100' to '110111'.

Figure 4:
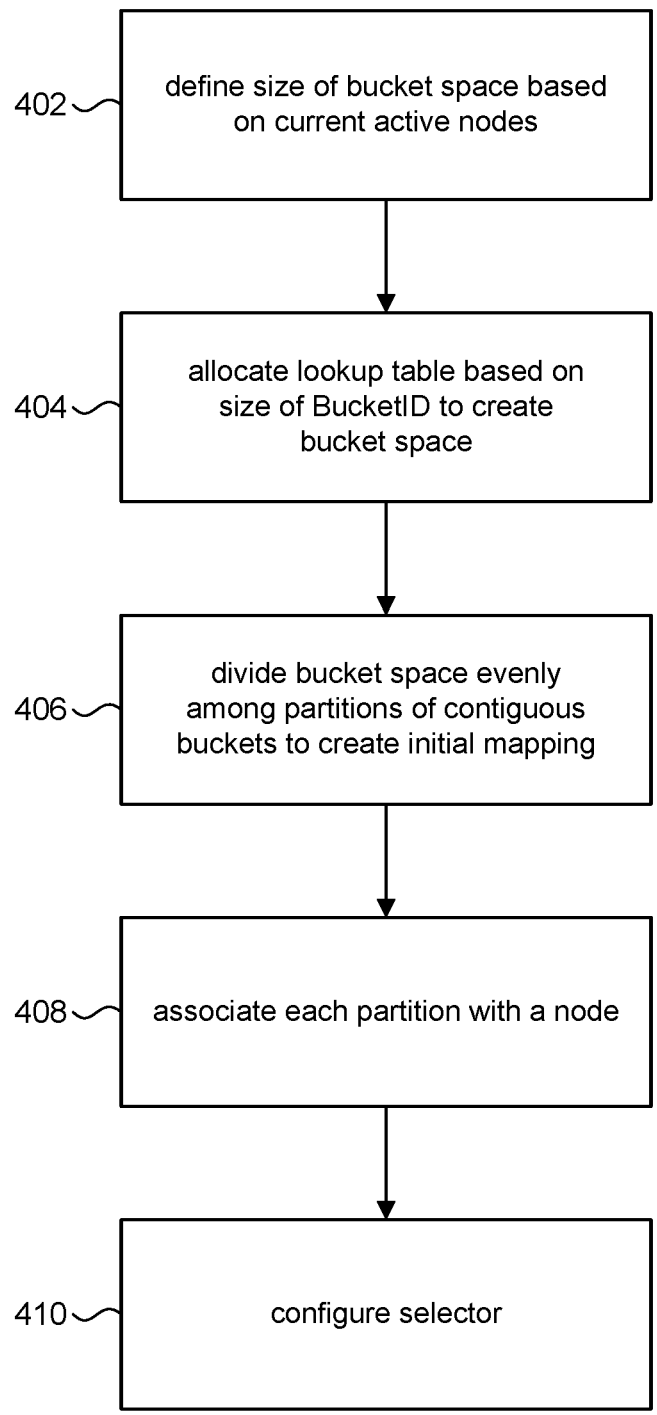
FIG. 4 illustrates a flow of operations for creating the initial lookup table in accordance with some embodiments.

Referring to FIG. 4 and other figures, the discussion will now turn to a high level description of processing in table constructor 118 (FIG. 1) for creating the initial lookup table 116 in accordance with the present disclosure. In some embodiments, for example, table constructor 118 may comprise hardware and/or firmware configured to perform processing in accordance with FIG. 4. In other embodiments, table constructor 118 may comprise computer executable program code, which when executed by a processor (e.g., 202, FIG. 2), may cause the computer system to perform the processing in accordance with FIG. 4. The flow of operations performed by the computer system is not necessarily limited to the order of operations shown.

The operations shown in FIG. 4 will be described with reference to FIG. 3. Merely for discussion purposes, we will use an example where the number of active nodes is three and the hash values (e.g., 302a) are 15-bit values.

At operation 402, the table constructor determines an initial size of the lookup table (and hence the size of the bucket space) based on the number of currently active nodes. In accordance with the present disclosure, the size of the lookup table is based on the current number of active nodes (e.g., 108) rather than the size of the hash values. In accordance with some embodiments, for example, a metric known as the unevenness metric can be used to determine a suitable size for the lookup table. Traffic unevenness refers to some nodes, on average, being subjected to more traffic than other nodes; for example, where the mapping directs more packets to some nodes than to other nodes. Nodes that handle higher traffic loads relative to other loads tend to exhibit lower performance than those other nodes. As the name suggests, the unevenness metric is a measure of traffic unevenness.

In some embodiments, for example, the size of the lookup table can be iteratively determined based on an unevenness metric as follows:

Select a candidate size (S) for the lookup table—An initial candidate size, for example, can be based on the current number (N) of active nodes. In some embodiments, for example, the size S can be a power of two that is greater than N (e.g., S≥N, where S=$2^m$ and m is an integer), although S can be a number not based on a power of two. Suppose, for instance, N is three (nodes M0, M1, M2); then an initial candidate size S can be four.

Compute an unevenness metric using three nodes and the current candidate size of the lookup table. This part is discussed below.

If the unevenness metric exceeds a predetermined unevenness threshold limit, then increase the candidate size to the next power of 2; e.g., S=4 to S=8.

Repeat the process until the unevenness metric falls below the predetermined value. The size S of the lookup table at the end of the process defines a bucket space where the buckets (and hence the traffic) are divided among the current set of active nodes as evenly as possible.

The unevenness metric mentioned above is an indication of how evenly the incoming traffic (FIG. 1) can be distributed among the active nodes. In some embodiments, the unevenness metric can be computed as a maximum percentage difference between any two nodes ("max percentage" metric) or a maximum ratio between any two nodes ("max ratio" metric), although it will be appreciated that other metrics can be used to assess evenness. Both metrics start with distributing all buckets in the bucket space among the active nodes as evenly as possible, and then computing the metric based on that distribution. For example, assume we have three active nodes M0, M1, M2. If the candidate size of the bucket space is four buckets, then a most even distribution of buckets to nodes can be to give two buckets to M0, and one bucket each to M1 and M2. If the candidate size of the bucket space is eight buckets, then a most even distribution can give three buckets to M0, three buckets to M1, and two buckets to M2. If the candidate size of the bucket space of 16 buckets, then a most even distribution can result in six buckets to M0, five buckets to M1, and five buckets to M2, and so on. The discussion will now turn to a brief description of the max percentage metric and the max ratio metric.

The max percentage metric can be defined as the maximum difference between the percentages of allocated buckets between any two nodes. Assuming three active nodes, the following table (Table I) shows the max percentage metrics for three candidate sizes of the bucket space:

TABLE I

| | |
|---|---|
| 4 buckets: M0 (2, 50%), M1 (1, 25%), M2 (1, 25%) | . . . max percentage = 25% |
| 8 buckets: M0 (3, 37.5%), M1 (3, 37.5%), M2 (2, 25%) | . . . max percentage = 12.75% |
| 16 buckets: M0 (6, 37.5%), M1 (5, 31.25%), M2 (5, 31.25%) | . . . max percentage = 6% |

The numbers in the parentheses show the number of buckets and the percentage of the total number of buckets for each node. A higher difference between two nodes indicates that one node can potentially carry a higher percentage of traffic as compared to the other node. For example, in the 4-bucket configuration, node M0 can be loaded with 50% of the traffic while the other nodes may see only 25% of the traffic, indicating that a larger bucket space should be used in order to even out the traffic among the nodes. Referring to the selection process described above, if the unevenness threshold limit is set at a max percentage of 20%, for example, then the final size of the lookup table would be eight buckets.

The max ratio metric can be defined as the maximum ratio of allocated buckets between any two nodes. Assuming three active nodes, the following table (Table II) shows the max ratio metrics for three candidate sizes of the bucket space:

TABLE II

| | | | |
|---|---|---|---|
| 4 buckets: | M0 (2), | M1 (1), | M2 (1) . . . max ratio = 2 (e.g., M0:M1) |
| 8 buckets: | M0 (3), | M1 (3), | M2 (2) . . . max ratio = 1.5 (e.g., M1:M2) |
| 16 buckets: | M0 (6), | M1 (5), | M2 (5) . . . max ratio = 1.2 (e.g., M0:M2) |

The numbers in the parentheses show the number of buckets for each node. Consider the 4-bucket configuration. The ratio of the number of buckets allocated to M0 (2) to the number of buckets allocated to M1 (1) is two (likewise for the ratio between M0 and M2), whereas the ratio of the number of buckets allocated to M1 to the number of buckets allocated to M2 is one. It can be seen, therefore, that the max ratio for the 4-bucket configuration is two. This indicates that one node M0 may carrying twice as much traffic as node M1 or M2, indicating that a larger bucket space should be used in order to even out the traffic among the nodes. Referring to the selection process described above, if the unevenness threshold limit is set at a max ratio of 1.4, for example, then the final size of the lookup table would be set at 16 buckets, when using a power of two.

Having determined a suitable size S of the lookup table, the table constructor can determine an appropriate size (e.g., number of bits) for the BucketID (e.g., 306). As noted above, in some embodiments S can be a power of two, in which case the number of bits used to represent the BucketID is simply $\log_2 S$. In other embodiments, where S is not a power of two, the number of bits n used to represent the BucketID can be computed by computing $$n=\log_2(S)+1,$$

where the "+1" may be needed to ensure that $2^n \geq S$. The number of bits n determines the number of bit to select from the hash value (e.g., 302a). As explained above, for discussion purposes, the bit positions will be based on the leftmost bits of the hash value. As an example, for a 15-bit hash value where n=6, the BucketID can be generated using a subset of bits of the hash value selected according the following set of bit positions: $b_{14}$, $b_{13}$, $b_{12}$, $b_{11}$, $b_{10}$, and $b_9$.

At operation 404, the table constructor allocates a lookup table (e.g., 308) from memory comprising $2^n$ entries, where n is the size of the BucketID determined above. In the example shown in FIG. 3, BucketID 306 is a 6-bit value (n=6) and so enough memory can be allocated to create a lookup table comprising 64 entries to define bucket space of 64 buckets.

At operation 406, the table constructor divides the bucket space evenly into one or more partitions based on the number of active nodes to create an initial mapping of buckets to nodes. If the number of active nodes divides evenly (e.g., is an integral multiple) into number of buckets in the bucket space, then equal sized partitions of the bucket space can be associated with each node. If the number of active nodes is not an integral multiple of the number of buckets in the bucket space, then some partitions will have one more bucket than the other partitions. For example, if there are eight active nodes, then a bucket space having 128 buckets can be divided into eight partitions having 16 buckets each. On the other hand, the same bucket space divided over seven active nodes can be partitioned into five partitions of 18 buckets and two partitions of 19 buckets.

Figure 5:
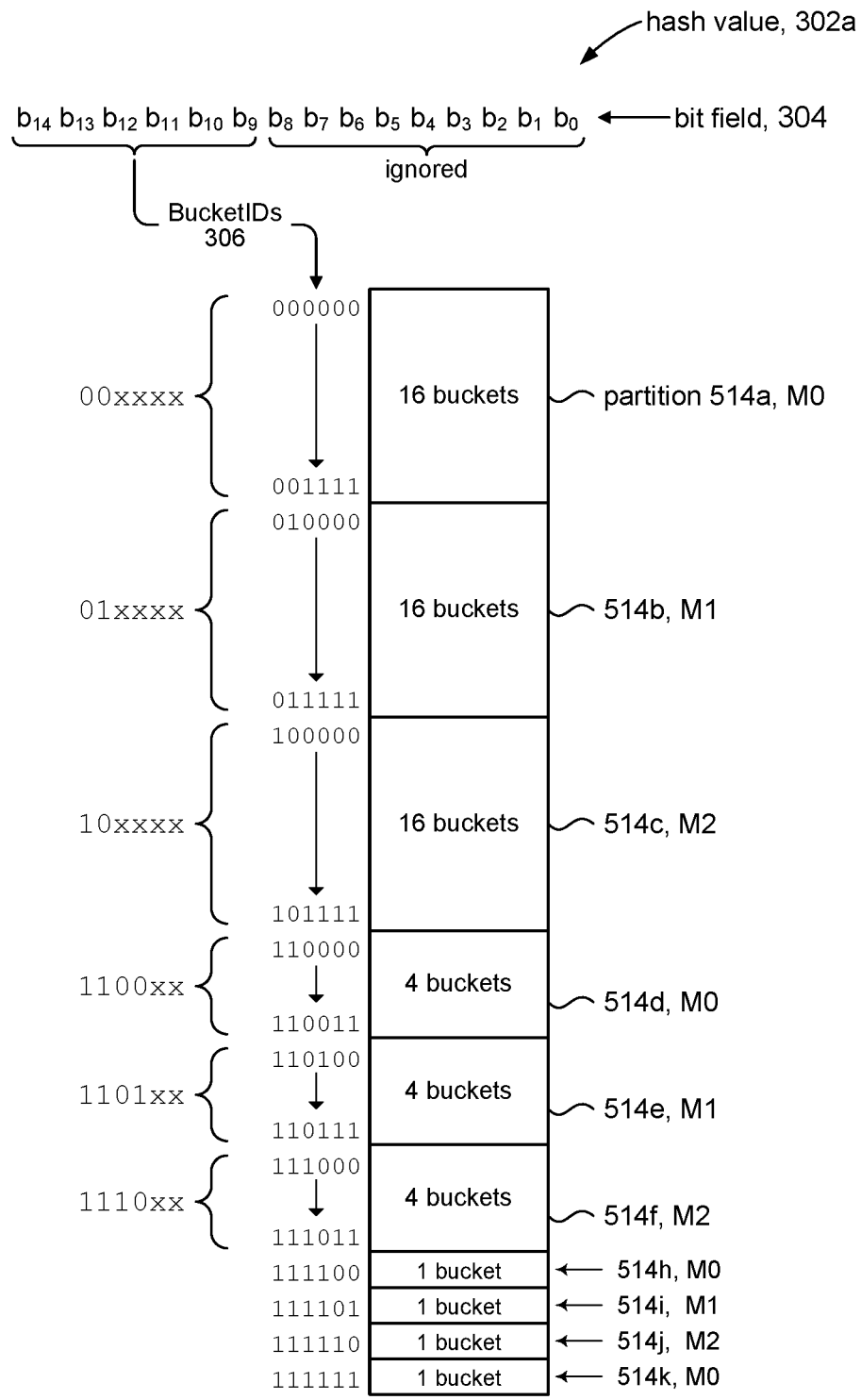
FIG. 5 illustrates some details of an initially constructed lookup table in accordance with some embodiments.

The partitioning can be achieved in any suitable manner. In some embodiments, for example, the lookup table can be scanned in linear fashion to define a partition for each node. For example, assume three active nodes and a bucket space of 64 buckets. A linear allocation may allocate buckets 1-21 in the lookup table to the first node (21 buckets), buckets 22 to 42 to the second node (21 buckets), and buckets 43-64 to the third node (22 buckets). In other embodiments, the lookup table can be recursively processed to iteratively define a succession of increasingly smaller partitions, such as shown in FIG. 5 for example.

In other embodiments, the allocation can be made in contiguous buckets of $2^n$. Assuming again, for example, three active nodes and a bucket space of 64 buckets, the allocation algorithm can proceeds as follows:

Determine the largest $2^n$ that can be allocated equally. In our example, for instance, it is 16, so that each of the three nodes is allocated 16 contiguous buckets. The remaining number of buckets is $(64-(3\times16))=16$.

Repeat the foregoing with the remaining 16 buckets: the largest $2^n$ contiguous buckets is 4, so each node gets 4 contiguous buckets, leaving a remainder of $(16-(3\times4))=4$.

Repeat again with the remaining 4 buckets: the largest $2^n$ contiguous buckets is 1, so each node gets 1 contiguous bucket, leaving a remainder of $(4-(3\times1))=1$. The remaining 1 bucket can be allocated to one of the three nodes.

This approach allows reforming chunks of contiguous buckets that lie on power of 2 boundaries, which can be useful for compression techniques and shrinking the lookup table (e.g., when an active node is removed). A power of 2 boundary can be defined as the boundary between a bucket whose root address (i.e., an address with no leading zeroes) is $2^{n-1}-1$ and a bucket whose root address is $2^n$; see, for example, FIG. 11B.

It can be appreciated, of course, that the table constructor can employ any suitable technique to divide the bucket space among the active nodes as evenly as possible.

At operation 408, the table constructor associates each partition with an active node. More particularly, the buckets in each partition can be associated with the node corresponding to that partition. In some embodiments, for example, this can include at least storing the node identifiers into the buckets (e.g., entries in the lookup table). Referring to FIG. 5, for example, partition 514a is associated with node M0, and so each of the 16 buckets in partition 514a is associated with M0 (e.g., by storing an identifier of M0 into each bucket).

At operation 410, the table constructor configures selector 114 (FIG. 1) to generate BucketIDs in accordance with the present disclosure to access the lookup table. In some embodiments, for example, selector 114 can be a programmable device comprising MUXs, shift registers, or the like. Selector 114 can be a programmed to select a predetermined portion (subset) of the input bit field according to a set of bit positions, and generate BucketID 306 using the selected bits. Referring to the example shown in FIGS. 3 and 5, for instance, the input can be a 15-bit hash value 302a and the BucketID can comprise the left-most (e.g., high order) n bits of that input, where n is the number of bits in the BucketID determined at operation 402. It will be appreciated that in other embodiments, selector 114 can be configured to select the right-most n bits from the bit field of the input, n bits from the middle of the bit field, and in general any n bits from the bit field.

Figure 6:
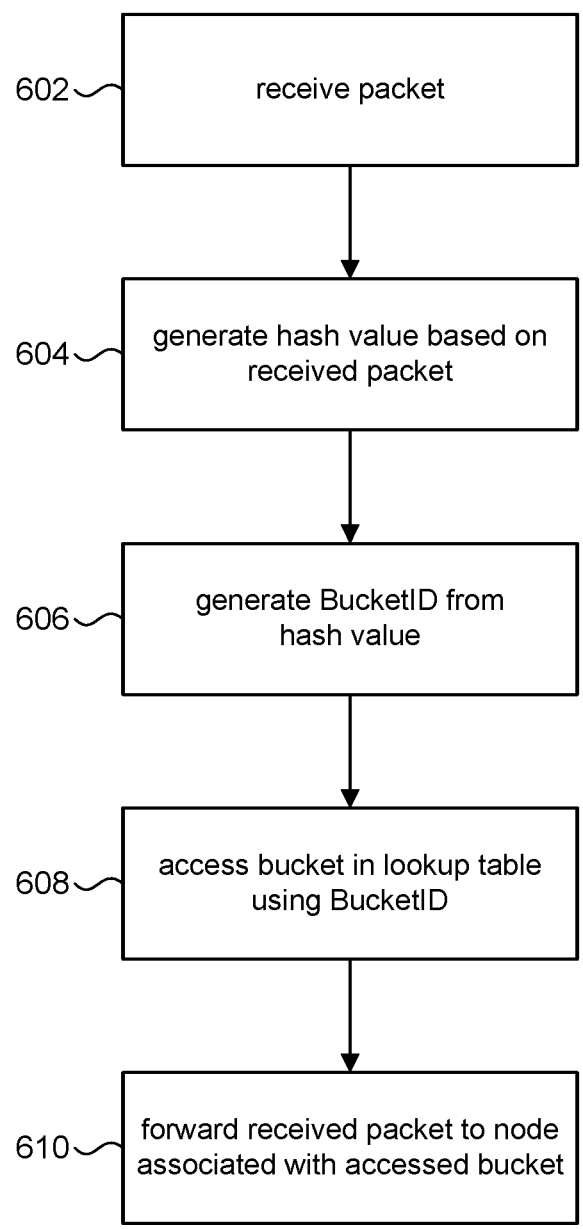
FIG. 6 illustrates a flow of operations for forwarding a packet in accordance with some embodiments.

Referring to FIG. 6 and other figures, the discussion will now turn to a high level description of processing in packet forwarding module 100 (FIG. 1) for forwarding packets 102 in accordance with the present disclosure. In some embodiments, for example, packet forwarding module 100 may comprise hardware and/or firmware configured to perform processing in accordance with FIG. 6. In other embodiments, table constructor 118 may comprise computer executable program code, which when executed by a processor (e.g., 202, FIG. 2), may cause the computer system to perform the processing in accordance with FIG. 6. The flow of operations performed by the computer system is not necessarily limited to the order of operations shown.

At operation 602, the packet forwarding module receives a packet from the incoming traffic.

At operation 604, the packet forwarding module generates a mapping value that is used to forward the received packet to a node. In accordance with the present disclosure, a predetermined hash function can be used to determine the mapping value (hash value), and as discussed below, the same predetermined hash function can continue to be used after the lookup table is increased to accommodate new nodes.

At operation 606, the packet forwarding module generates the BucketID from the bits that comprise the hash value, such as described in connection with FIG. 3 for example, where the BucketID is generated using bits from the hash value selected according to a given set of bit positions.

At operation 608, the packet forwarding module uses the obtained BucketID to index the lookup table to access an entry (the bucket) in the lookup table. As explained above, entries in the lookup table can be initialized with identifiers of the active nodes to which packets can be forwarded. The lookup table therefore serves to map a received packet to an active node.

At operation 610, the packet forwarding module forwards the received packet to the node identified in the accessed entry.

Referring to FIGS. 7, 8, 9, 10A-10D, and other figures, the discussion will now turn to a high level description of processing in table constructor 118 (FIG. 1) for adding another active node (member) to lookup table 116 (bucket space) in accordance with the present disclosure. In some embodiments, for example, table constructor 118 may comprise hardware and/or firmware configured to perform processing in accordance with FIG. 7. In other embodiments, table constructor 118 may comprise computer executable program code, which when executed by a processor (e.g., 202, FIG. 2), may cause the computer system to perform the processing in accordance with FIG. 7. The flow of operations performed by the computer system is not necessarily limited to the order of operations shown.

At decision point 702, the table constructor determines whether adding the new node to the lookup table will exceed a predetermined unevenness limit (discussed above). For example, if unevenness remains bounded with the addition of the new node, then processing can proceed to operation 722, where the new node is added to the existing bucket space. This aspect is discussed further below. On the other hand, if the unevenness limit is exceeded by the addition of the new node, then processing can proceed to operation 704.

At operation 704, the table constructor determines a new size of the bucket space based on the current number of active nodes. In some embodiments, for example, the table constructor can increase the number of bits used to represent the BucketID, and hence the size of the bucket space. For example, increasing the size of the BucketID by one bit will double the size of the lookup table (bucket space). Doing so may be sufficient to bring the unevenness within the predetermined limit for the system. In some embodiments, the BucketID may be increased by more than one bit, for example, to ensure a large enough bucket space for subsequent addition of nodes. In general, increasing the BucketID by n additional bits will increase the bucket space by a factor of $2^n$. The new size of the bucket space can be iteratively arrived at, for example, by increasing the BucketID one bit at a time and assessing the unevenness metric each time.

In accordance with the present disclosure, a new BucketID can be defined by increasing the size of the subset of the bit field of the hash function that was used to define the old BucketID. Referring for a moment to FIG. 8, suppose old BucketID 802 is defined by a bit field subset comprising six bits, for example, selected according to the set of bit positions comprising bits $b_{14}$ to $b_9$ of a 15-bit bit field 804 of a predetermined hash function 806. In accordance with some embodiments, new BucketID 812 can be defined by increasing the size of that bit field subset to include an additional one or more bit positions. FIG. 8, for example, shows new BucketID 812 comprises eight bits of bit field 804, namely bits $b_{14}$ to $b_7$, where bit position $b_7$ has been added.

At operation 706, the table constructor creates a new lookup table according the new BucketID. In some embodiments, for example, the table constructor may allocate memory for an entirely new lookup table. In other embodiments, the table constructor can increase the size of the existing lookup table by allocating additional memory to it.

At operation 708, the table constructor copies or otherwise map the buckets from the old lookup table to buckets (entries) in the new lookup table, including, for example, copying contents from the old buckets to the new buckets. In some embodiments, for example, each bucket in the old lookup table maps to two (or more) corresponding buckets in the new lookup table. To illustrate this aspect of the present disclosure, refer for a moment to FIGS. 8, 9A, 9B, and 9C.

FIG. 9A, for example, shows a single bucket 912 in an initial (old) lookup table 902 (bucket space) indexed by BucketID 922 (e.g., defined from a 6-bit subset of the bit field 804 of the predetermined hash function 806 in FIG. 8). In our example, the set of bits from bit field 804 that comprise old BucketID 922 are $b_{14} \ldots b_9$; call this the "min set." As illustrated in FIG. 9B, new lookup table 904 in accordance with the present disclosure can be defined by new BucketID 924 that comprises the min set combined with one or more bits (e.g., bit $b_8$) from bit field 804, for example via concatenation. New lookup table 904 defines a larger bucket space than old lookup table 902. Each (old) bucket 912 in old lookup table 902 corresponds to two new buckets 914 in new lookup table 904 by virtue of having new BucketID 924 having the min set in common with old BucketID 922 and; in other words, BucketID 924 of each new bucket 914a and 914b includes BucketID 922 of its corresponding old bucket 912. FIG. 9C shows another example where new BucketID 926 is defined by including two additional bits from hash function bit field 804 with the min set of old BucketID 922. Each bucket 912 in old lookup table 902 corresponds to four new buckets 916 in new lookup table 906, and BucketID 926 of each new bucket 916a, 916b, 916c, and 916d includes BucketID 922 of its corresponding old bucket 912.

In accordance with the present disclosure, the table constructor can associate each bucket 914 in new lookup table 904 with the same node as its corresponding old bucket 912. This is illustrated in FIGS. 9A and 9B where node M0 in bucket 912 in the old lookup table 902 is associated with two new buckets 914a, 914b in new lookup table 904 that correspond to bucket 912.

Increasing the size of the lookup table in accordance with the present disclosure described above does not disrupt the existing mapping between buckets and nodes. FIGS. 8, 9A and 9B illustrate this aspect of the present disclosure. We see that bits $b_{14} \ldots b_9$ (the min set) are common to original BucketID 922 and new BucketID 924. In accordance with the present disclosure, the same predetermined hash function is used to index new lookup table 912 as with old lookup table 902. Therefore, a packet will produce the same min set of bits, irrespective of whether old lookup table 902 or new lookup table 904 is being used; the hash function itself is decoupled from the lookup tables. If a packet maps to node M0 (via bucket 912) in old lookup table 902, then the same packet will also map to node M0 in new lookup table 904, via bucket 914a or 914b depending on the value of the additional bit $b_8$ used to define the new BucketID ($b_8$=0 maps to 914*a*, $b_8$=1 maps to 914*b*). As such, packets in a given flow are not be mapped to new nodes; packets that were mapped to node $M_x$ in old lookup table 902 are still be mapped to node $M_x$ in new lookup table 904. Likewise for the lookup table example in FIG. 9C; the same packet will map to node M0 in new lookup table 906 via bucket 916*a*, 916*b*, 916*c*, or 916*d*, depending on the value of the additional bits $b_8$ $b_7$ (00→916*a*, 01→916*b*, 10→916*c*, 11→916*d*).

Figure 7:
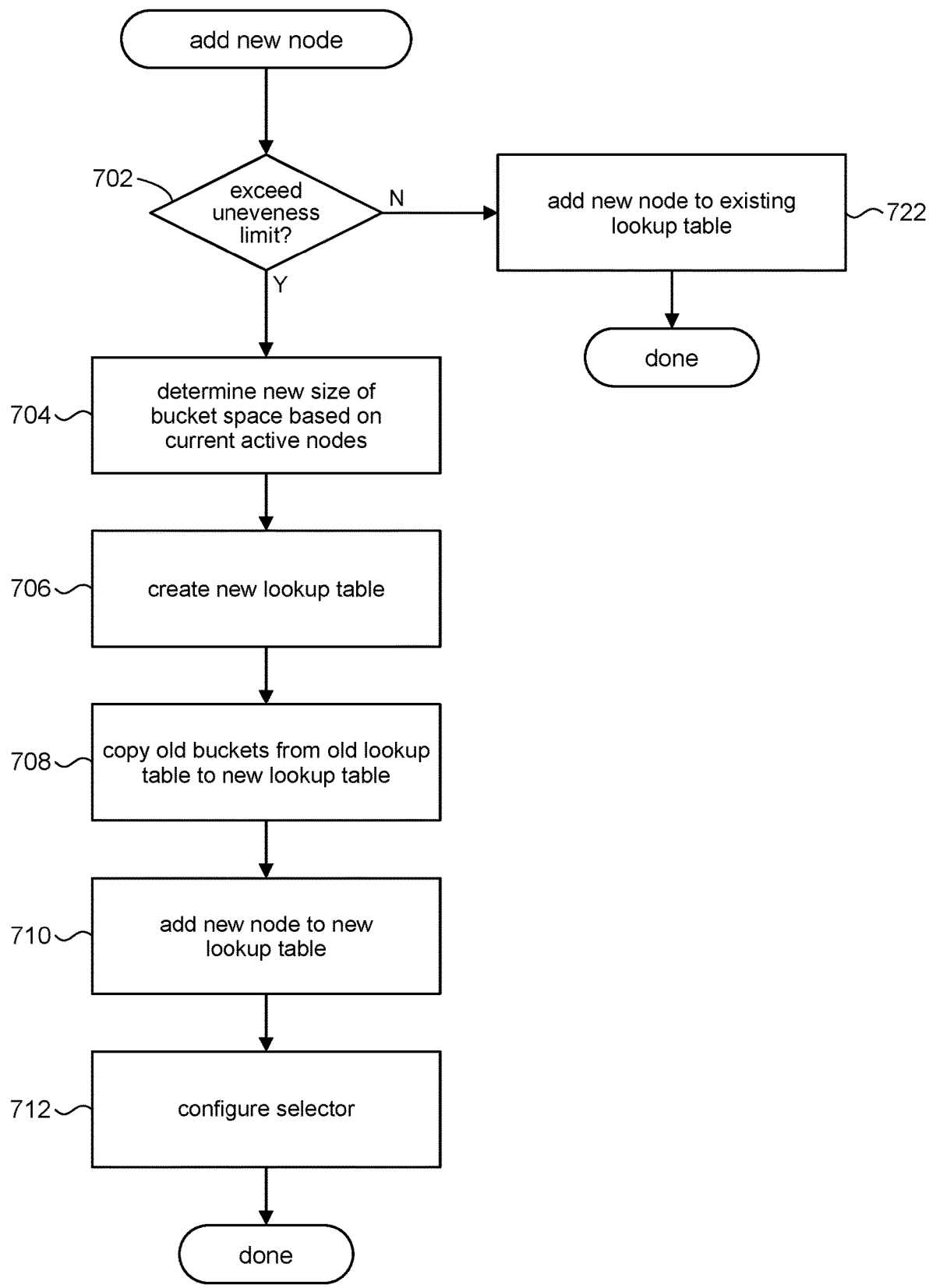
FIG. 7 illustrates a flow of operations for changing the size of the lookup table in response to adding a node to the set of active nodes in accordance with some embodiments.
Figures 10A, 10B:
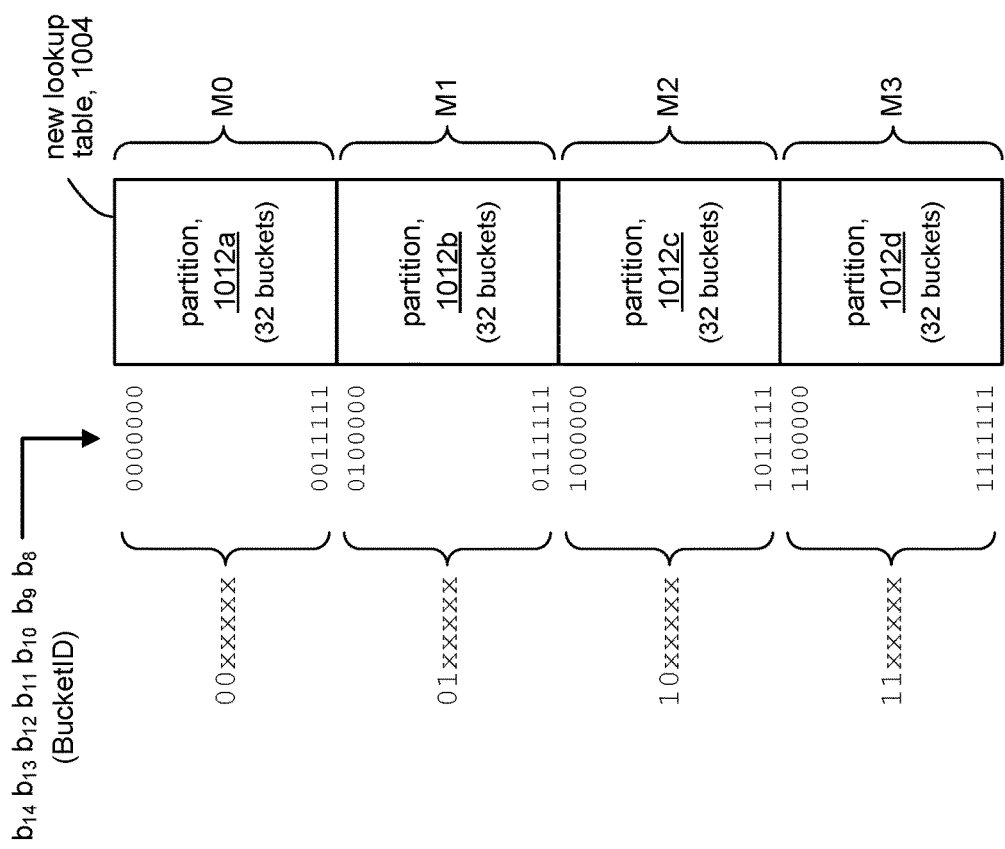
FIGS. 10A and 10B illustrate details of old and new lookup tables in accordance with some embodiments.

Continuing the description of FIG. 7, at operation 710, the table constructor adds the new node to the new lookup table. Referring for a moment to FIGS. 10A and 10B, at this point, as explained above, new lookup table 1004 is initialized with bucket-to-node associations based on the bucket-to-node associations of old lookup table 1002. The bucket space in the new lookup table will be partitioned as in the old lookup table, where new buckets have the same nodes as their corresponding old buckets. The example in FIGS. 10A and 10B show the bucket space partitioned into four groups of buckets, corresponding to four nodes M0-M3. In order to add a new node, an additional partition of buckets will be defined. In accordance with the present disclosure, each existing partition will contribute some number (N) of its buckets to the new partition. In accordance with some embodiments, N can be computed as follows:

$$N = B \times \frac{1}{P} \times \frac{1}{Q},$$

where
 N is the number of buckets from each existing partition to be re-allocated
 B is the number of buckets in the lookup table,
 P is the number of new nodes,
 Q is the number of old nodes.
For example, the example in FIG. 10B shows B=128, P=5 (assume we are adding one node), Q=4. The value of N is 6.4, meaning 6.4 buckets in each of the existing partitions 1012*a*-1012*d* should be re-assigned to the new partition. This results in five partitions having 25.6 buckets each. Additional processing can be performed to adjust the value of N to obtain whole number buckets. For example N can be set to 7 for two of the existing partitions and 6 for the other two existing partitions. The lookup tables in FIG. 10B can be textually represented as shown in FIG. 10C.

Figures 10C, 10D:
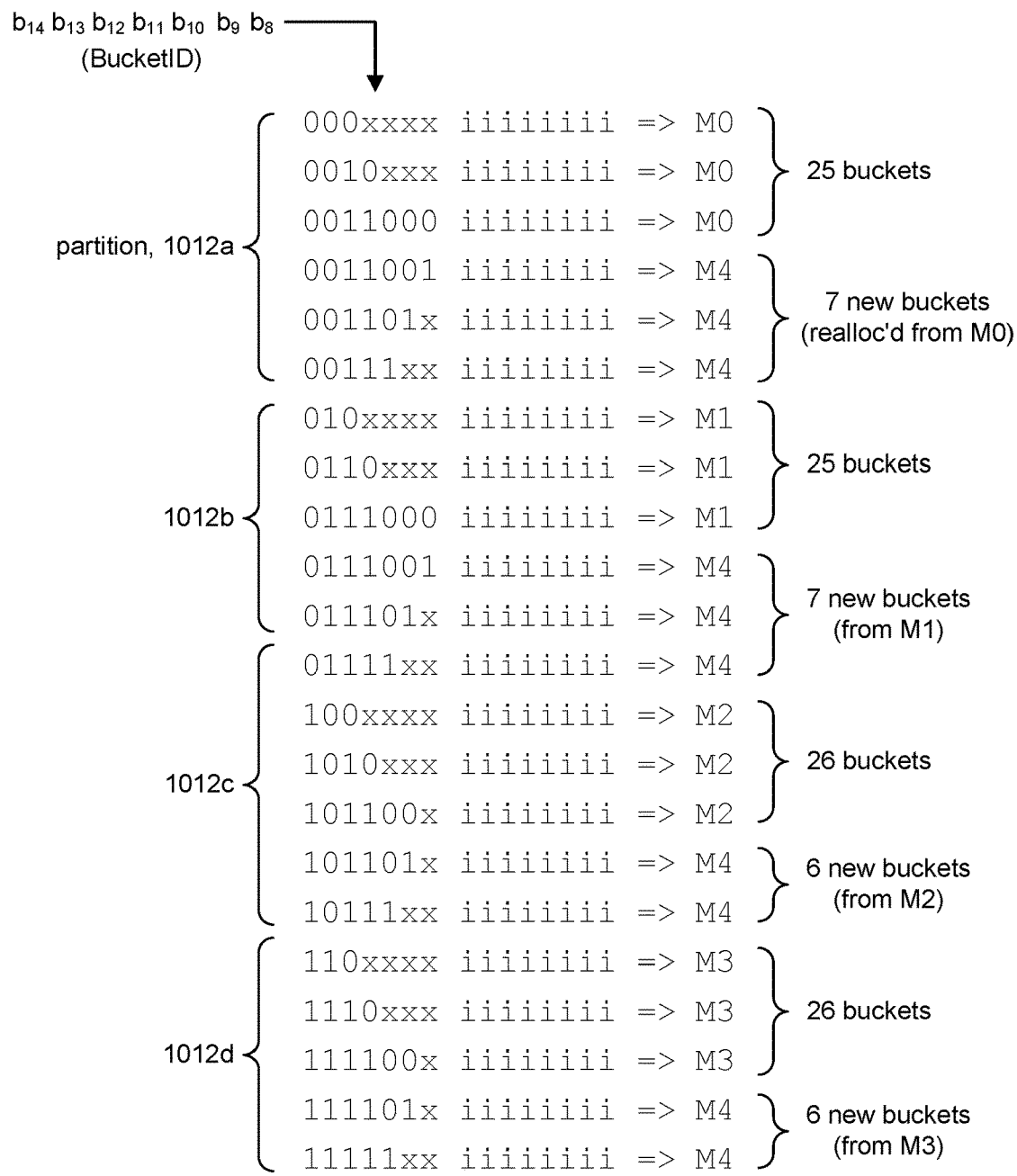
FIG. 10C is textual representation of the lookup table shown in FIG. 10A.
FIG. 10D illustrates re-partitioning a bucket space to in response to adding a new node in accordance with some embodiments.

FIG. 10D shows how the lookup table in FIG. 10C can be repartitioned to accommodate the new node M4 in accordance with some embodiments, for example, by performing a linear scan down the lookup table and reassigning (reallocating) buckets to the new node according to the value of N computed above. We see that seven buckets from partition 1012*a* that were previously associated with node M0 are now associated with node M4. Seven buckets from partition 1012*b* that were previously associated with node M1 are now associated with node M4. Six buckets from partition 1012*c* (M2) are now associated with node M4, and likewise with partition 1012*d*. The result is that two partitions each have 25 buckets and three partitions each have 26 buckets.

Referring to FIGS. 10C and 10E, in some embodiments, the repartitioning can include initially reassigning (reallocating) chunks of contiguous buckets to the new node that lie on a power of 2 boundary (e.g., FIG. 11B), while at the same time avoiding breaking or splitting contiguous buckets of two (i.e., adjacent buckets). For example, consider the following eight-bucket lookup table:

| | |
|---|---|
| 000→M0 | |
| 001→M0 | |
| 010→M0 | |
| 011→M0 | |
| 100→M1 | |
| 101→M1 | |
| 110→M1 | |
| 111→M1 | |

Suppose we have a new node M2 and suppose two buckets from node M0 are going to be allocated to node M2. The repartitioning can allocate contiguous buckets 000 and 001 to node M2. This allocation maintains contiguous buckets; buckets 000 and 001 for node M2 are contiguous and buckets 010 and 011 for node M0 are contiguous. On the other hand, allocating buckets 001 and 010 to node M2 gives two contiguous buckets to node M2, but splits the remaining two buckets (000 and 011) for node M0. As another example, suppose we have an eight-bucket lookup table in the following state:

| | |
|---|---|
| 000→M0 | |
| 001→M0 | |
| 010→M1 | |
| 011→M0 | |
| 100→M1 | |
| 101→M1 | |
| 110→M1 | |
| 111→M0 | |

If M0 and M1 are giving a bucket to a new node M2, then the allocation can give buckets 010 and 011 to M2, or give buckets 110 and 111 to M2. Either allocation consolidates two contiguous buckets. Accordingly, in some embodiments the allocation of buckets in partition 1012*a* shown in FIG. 10C for new node M4 can go as follows:

| | |
|---|---|
| the first 16 buckets, | 000xxxx→M0 |
| the next 8 buckets, | 0010xxx→M0 |
| the next 4 buckets, | 00110xx→M4 |
| the next 2 buckets, | 001110x→M4 |
| the next 1 bucket, | 0011110→M4 |
| the next 1 bucket, | 0011111→M0 |

Partitions 1012*b*, 1012*c*, and 1012*d* can be similarly partitioned, resulting in the partitioning shown in FIG. 10E. This partitioning minimizes splitting of contiguous buckets. If another node is added, M4 and M0 in partition 1012*a* can both contribute buckets 0011110 and 0011111 to reform a contiguous chunk of two blocks, and likewise for partitions 1012*b*, 1012*c*, and 1012*d*.

By re-assigning buckets from each existing partition to the new partition in accordance with the present disclosure, even distribution of traffic among the nodes can be maintained, thus improving the overall performance among the node because no one node carries a heavier traffic load than another node to within an acceptable unevenness limit. It can be seen that the re-allocation of buckets to the new node M4 will result in redirection of some traffic; for example, a packet whose BucketID is 0011001 no longer maps to node M0, but rather to node M4. However, by re-assigning an equal number of buckets from each existing partition to the new node in accordance with the present disclosure, the disruption created by the redirection is spread across each node so that no one node is disproportionately affected.

Completing the description of operations in FIG. 7, at operation 712, the table constructor configures selector 114

(FIG. 1) to generate the newly defined BucketIDs 812. In accordance with the present disclosure, the new BucketID will comprise the same bits selected from the bit field of the hash value according to the set of bit positions that define the old BucketID plus additional bits selected from the bit field according to one or more additional bit positions.

The operations in FIG. 7 describe growing the lookup table (and hence the bucket space) in response to the addition of a single new node. In instances where a more than one new node is being added, the operations in FIG. 7 can be repeated for each new node, or the table expansion can occur for multiple new nodes at the same time.

Figures 11A, 11B, 11C:
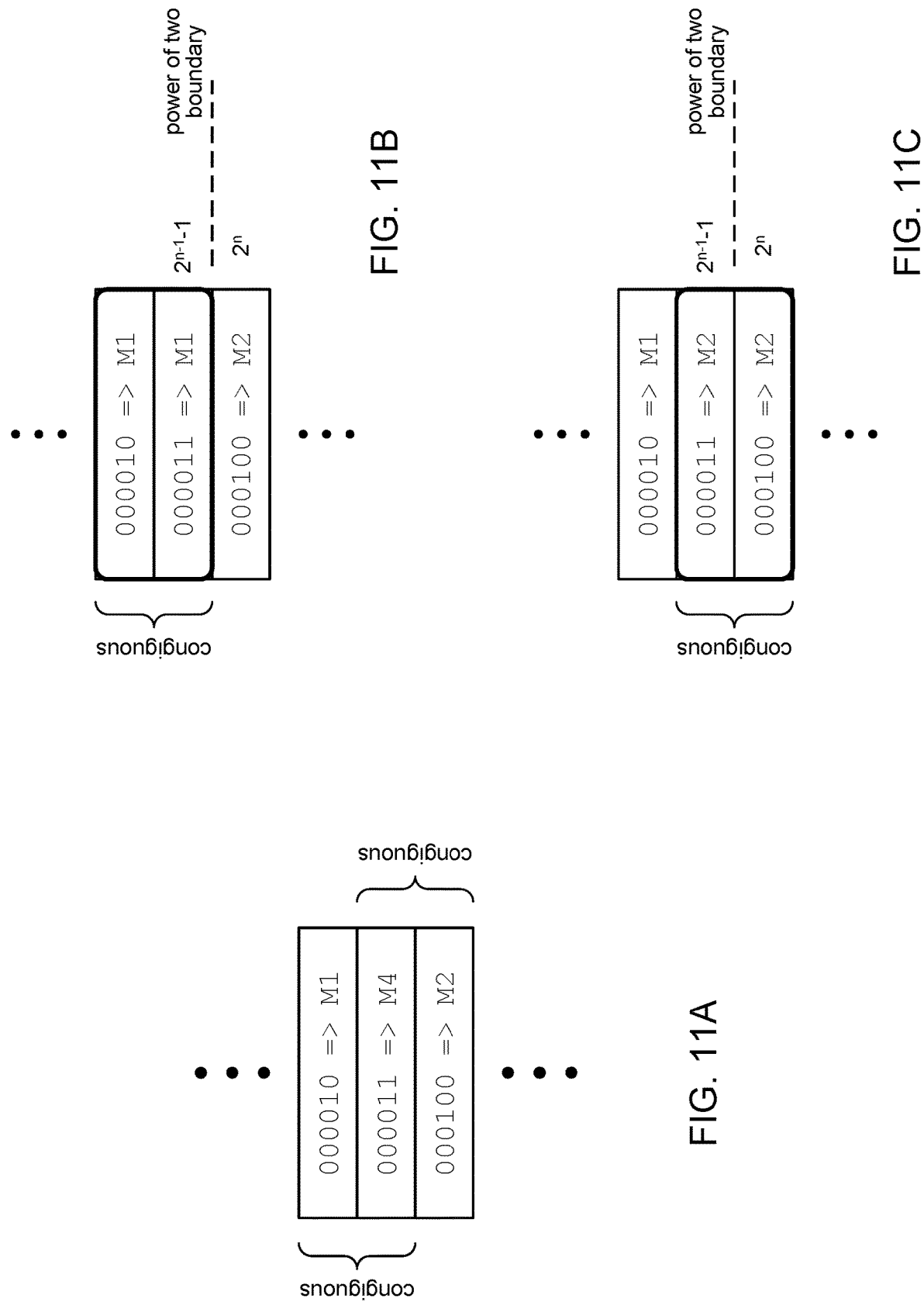
FIGS. 11A, 11B, 11C illustrate combining buckets in response to removing a node in accordance with some embodiments.

Referring to FIGS. 11A-11C, the discussion will now turn to a description for reducing the lookup table in response to removal of an existing node. Buckets previously assigned to the removed node can be reallocated or reassigned to the remaining nodes. In some embodiments, for example, a bucket can be reassigned to the node of a contiguous bucket. Consider FIG. 11A, for example, where node M4 (assigned to bucket 000011) is removed. The buckets that are contiguous or adjacent to the freed bucket 000011 are buckets 000010 (assigned to node M1) and 000100 (assigned to node M2). The freed bucket can be reassigned to the node associated with either bucket 000010 or bucket 000100 to form a contiguous chunk of two buckets. In accordance with some embodiments, the choice between bucket 000010 and bucket 000100 can be decided based on forming a chunk of contiguous buckets that lies on a power of 2 boundary, which as mentioned above can be defined as the boundary between a bucket whose root address (i.e., an address with no leading zeroes) is $2^{n-1}-1$ and a bucket whose root address is 2n. FIG. 11B shows that assigning the freed bucket to node M1 results in two contiguous buckets that lies on a power of 2 boundary, whereas in FIG. 11C assigning the freed bucket to node M2 results in two contiguous buckets that lies across (spans) the power of 2 boundary.

CONCLUSIONS

Embodiments in accordance with the present disclosure allow a lookup table for mapping packets to nodes to be dynamically re-sized in order to accommodate the addition of nodes to the set of active node and thus avoid having to overprovision the lookup table. An overprovisioned lookup table provides for a conservatively determined maximum number of active nodes to accommodate a worst case scenario even though much of the time the actual number of active nodes can be a fraction of the maximum. Statically overprovisioning the lookup table to accommodate for a worst-case maximum number of nodes, which may never happen, can be wasteful of memory.

Dynamically resizing the lookup table in accordance with the present disclosure allows the size of the lookup table to change only as the current number of active nodes changes. The present disclosure can dynamically resize the lookup table on an as needed basis; e.g., only when a new node is added. That way the size of the lookup table can be just large enough (e.g., within an acceptable levels of traffic unevenness) to accommodate the current number of active nodes without having to provision of non-existent node, thus improving the storage performance of the system.

Embodiments in accordance with the present disclosure define the bucket identifier as a subset of the bit field of the hash function. When the size of the lookup table needs to be re-sized (and hence the bucket identifier), a larger subset of the hash function's bit field is selected. This decouples the lookup table from the hash function itself, allowing the same hash function to be used with every new lookup table. By decoupling the lookup table from the hash function, the number of flows that have to be remapped can be minimized. Remapping packets in a flow from one node to another (remapped) node can impact performance in the remapped node because state information and/or cached data for that flow will be lost and the remapped node may have to recover such information. Keeping the remapping to a minimum can therefore improve performance of traffic handling among the nodes.

The present disclosure allows for the lookup table to be dynamically resized in order to consume as little memory as possible for the lookup table, creating a lookup table only as large as needed to accommodate the current set of active nodes. At the same time, the mapping from buckets to nodes in the old lookup table is retained as much as possible in the new lookup table to avoid redirecting packet traffic for a flow to another node, or at least reuse the number of flows that have to be redirected.

The present disclosure allows for a hash function to be overprovisioned in order to improve the random distribution of hash values and accommodate a worst case operating scenario, but never have to realize such a situation. For example, a hash function can be defined that outputs a 48-bit hash value. The large bit field can ensure a more random distribution of hash values (and hence an even distribution of traffic) and provide plenty of headroom to dynamically grow the lookup table as needed without having to realize an enormous lookup table (256 quadrillion entries) at the outset. The bucket identifier comprises only a subset of the hash value and has only as many bits as is needed to index the lookup table; e.g., a 128-entry lookup table only requires seven bits from the 48-bit hash value to construct the bucket identifier. If needed, the lookup table can be easily enlarged to 1024 entries just by using three more bits from the hash value.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method in a network device, the method comprising:
   forwarding a received packet to a node in a first plurality of nodes using a first subset of bits of a mapping value, computed from the received packet with a predetermined mapping function, as an address of an entry in a first lookup table comprising a plurality of entries that are associated with the first plurality of nodes, the received packet being forwarded to the node associated with the addressed entry, the first subset of bits selected from the mapping value according to a first set of bit positions;
   creating a second lookup table in response to a new node being added to the first plurality of nodes to define a second plurality of nodes, each entry in the first lookup table corresponding to two or more entries in the second lookup table, each entry in the second lookup table being associated with either a node associated with its corresponding entry in the first lookup table or the new node added to the first plurality of nodes; and forwarding a subsequently received packet to a node from among the second plurality of nodes using a second subset of bits of a mapping value, computed from the subsequently received packet with the predetermined mapping function, as an address of an entry in the second lookup table, the subsequently received packet being forwarded to the node associated with the addressed entry, the second subset of bits selected from the mapping value according to a second set of bit positions, the second set of bit positions including the first set of bit positions plus one or more additional bit positions.

2. The method of claim 1, further comprising creating the first lookup table, including determining a number of entries for the first lookup table based on the number of nodes in the first plurality of nodes and determining a number of bit positions in the first set of bit positions based on the determined number of entries in the lookup table.

3. The method of claim 2, wherein the number of entries in the first lookup table is determined based on an unevenness metric.

4. The method of claim 2, further comprising creating a lookup table as the first lookup table comprising $2^n$ entries, where n is the determined number of bit positions in the first set of bit positions.

5. The method of claim 1, wherein creating the second lookup table includes determining a second set of bit positions by adding one or more additional bit positions to the first set of bit positions and creating a lookup table comprising $2^m$ entries as the second lookup table, where m is the determined number of bit positions in the second set of bit positions.

6. The method of claim 5, wherein the number of additional bit positions in the second set of bit positions is based on an unevenness metric.

7. The method of claim 1, wherein the second lookup table comprises $2^x$ times as many entries as in the first lookup table, where x is an integer greater than 0.

8. The method of claim 1, wherein each address of the entries in the second lookup table includes an address of their corresponding entries in the first lookup table.

9. The method of claim 1, wherein a given packet that maps to a given node using the first lookup table will map to the given node or to the new node using the second lookup table.

10. An apparatus comprising:
one or more computer processors; and
a computer-readable storage medium comprising instructions for controlling the one or more computer processors to:
forward a received packet to a node in a first plurality of nodes using a first subset of bits of a mapping value, computed from the received packet with a predetermined mapping function, as an address of an entry in a first lookup table comprising a plurality of entries that are associated with the first plurality of nodes, the received packet being forwarded to the node associated with the addressed entry, the first subset of bits selected from the mapping value according to a first set of bit positions;
create a second lookup table in response to a new node being added to the first plurality of nodes to define a second plurality of nodes, each entry in the first lookup table corresponding to two or more entries in the second lookup table, each entry in the second lookup table being associated with either a node associated with its corresponding entry in the first lookup table or the new node added to the first plurality of nodes; and
forward a subsequently received packet to a node from among the second plurality of nodes using a second subset of bits of a mapping value, computed from the subsequently received packet with the predetermined mapping function, as an address of an entry in the second lookup table, the subsequently received packet being forwarded to the node associated with the addressed entry, the second subset of bits selected from the mapping value according to a second set of bit positions, the second set of bit positions including the first set of bit positions plus one or more additional bit positions.

11. The apparatus of claim 10, wherein the computer-readable storage medium further comprises instructions for controlling the one or more computer processors to be operable to create the first lookup table, including determining a number of entries for the first lookup table based on the number of nodes in the first plurality of nodes and determining a number of bit positions in the first set of bit positions based on the determined number of entries in the lookup table.

12. The apparatus of claim 11, wherein the number of entries in the first lookup table is determined based on an unevenness metric.

13. The apparatus of claim 11, wherein the computer-readable storage medium further comprises instructions for controlling the one or more computer processors to be operable to create a lookup table comprising $2^n$ entries as the first lookup table, where n is the determined number of bit positions in the first set of bit positions.

14. The apparatus of claim 10, wherein creating the second lookup table includes determining a second set of bit positions by adding one or more additional bit positions to the first set of bit positions and creating a lookup table comprising $2^m$ entries as the second lookup table, where m is the determined number of bit positions in the second set of bit positions.

15. The apparatus of claim 14, wherein the number of additional bit positions is based on an unevenness metric.

16. The apparatus of claim 10, wherein each address of the entries in the second lookup table includes an address of their corresponding entries in the first lookup table.

17. A non-transitory computer-readable storage medium having stored thereon computer executable instructions, which when executed by a computer device, cause the computer device to:
forward a received packet to a node in a first plurality of nodes using a first subset of bits of a mapping value, computed from the received packet with a predetermined mapping function, as an address of an entry in a first lookup table comprising a plurality of entries that are associated with the first plurality of nodes, the received packet being forwarded to the node associated with the addressed entry, the first subset of bits selected from the mapping value according to a first set of bit positions;
create a second lookup table in response to a new node being added to the first plurality of nodes to define a second plurality of nodes, each entry in the first lookup table corresponding to two or more entries in the second lookup table, each entry in the second lookup table being associated with either a node associated with its corresponding entry in the first lookup table or the new node added to the first plurality of nodes; and forward a subsequently received packet to a node from among the second plurality of nodes using a second subset of bits of a mapping value, computed from the subsequently received packet with the predetermined mapping function, as an address of an entry in the second lookup table, the subsequently received packet being forwarded to the node associated with the addressed entry, the second subset of bits selected from the mapping value according to a second set of bit positions, the second set of bit positions including the first set of bit positions plus one or more additional bit positions.

18. The non-transitory computer-readable storage medium of claim 17, wherein the computer executable instructions, which when executed by the computer device, further cause the computer device to create the first lookup table, including determining a number of entries for the first lookup table based on the number of nodes in the first plurality of nodes and determining a number of bit positions in the first set of bit positions based on the determined number of entries in the lookup table.

19. The non-transitory computer-readable storage medium of claim 18, wherein the number of entries in the first lookup table is determined based on an unevenness metric.

20. The non-transitory computer-readable storage medium of claim 18, wherein producing the second lookup table includes determining a second set of bit positions by adding one or more additional bit position to the first set of bit positions and creating a lookup table comprising $2^m$ entries as the second lookup table, where m is the determined number of bit positions in the second set of bit positions.

* * * * *